United States Patent Office 2,791,397
Patented May 7, 1957

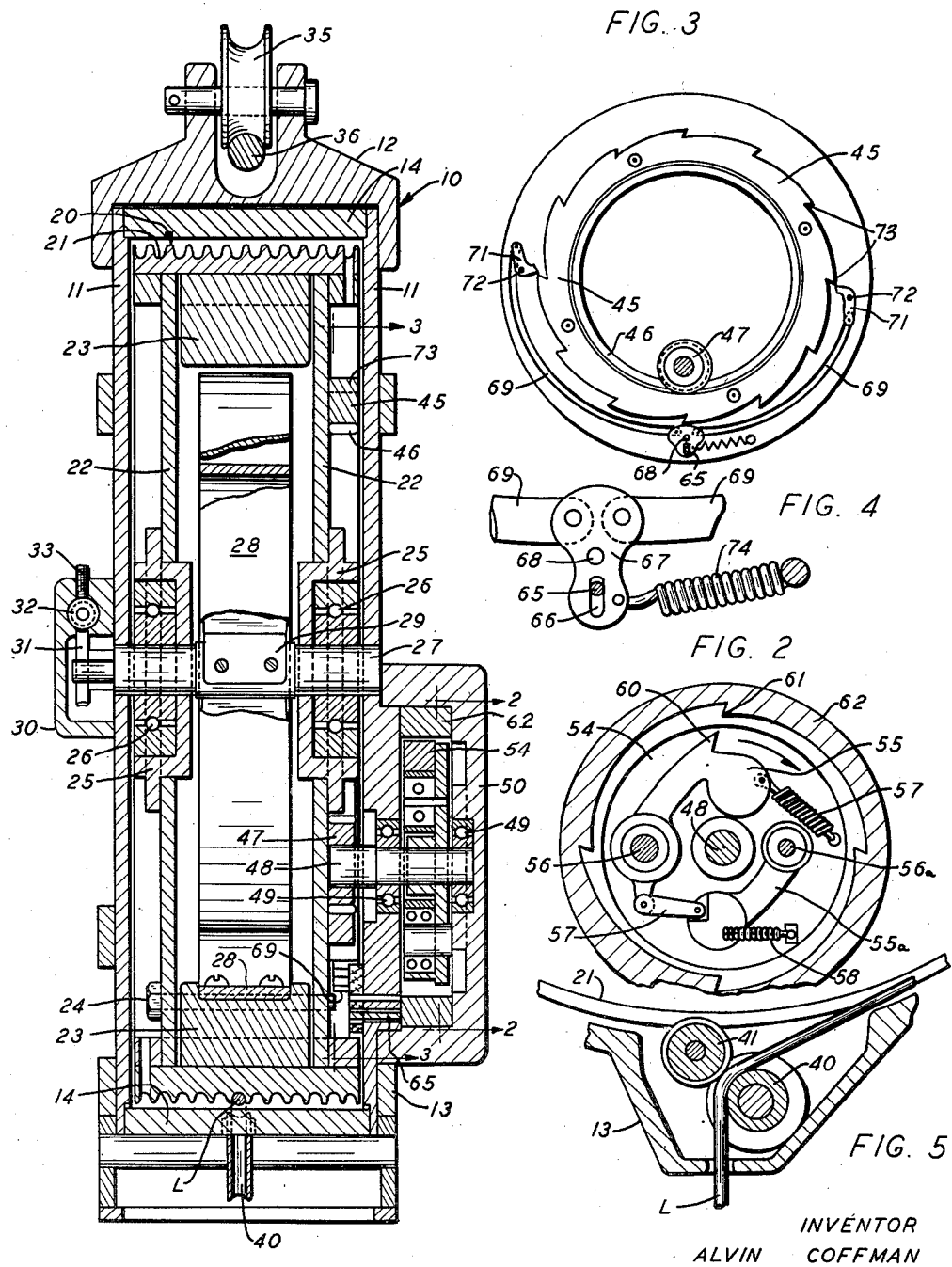

2,791,397

SAFETY REEL

Alvin Coffman, Indiana Harbor, Ind., assignor to Inland Steel Company, a corporation of Delaware Application November 24, 1954, Serial No. 471,045

3 Claims. (Cl. 254—159)

This invention relates to a safety device and more particularly to a device of this character usable by workmen on a steep roof.

In such instances as in others, it is desirable to provide the workmen with a safety line attachable to some fixed object or cable at one end and to the wearer's belt at the other. Furthermore, it is desirable that the safety line be upon an automatically retractable reel so that only the proper amount of line is extended at any given time whereby the line does not drag and become entangled with the workman's feet or be dragged over a painted surface.

Safety lines, including reels, have been designed for this purpose but so far as applicant is aware previous devices did not become effective immediately upon the workman starting to fall or immediately upon too rapid movement by the workman. That is, these prior devices permitted a considerable amount of falling or rapid movement before they checked the movement or descent of the workman. Consequently, when they did become effective they would check the fall or movement of the workman with a sudden jerk which in many instances was harmful and even injurious to the workman.

Furthermore, such safety devices as heretofore made required that the workman return to the reel which was usually at the fixed end of the safety line to unlock the reel after it had become locked due to a too rapid descent or movement by the workman.

According to this invention a reel is provided which normally tends to wind the safety line upon itself and which is equipped with an inertia governor which restricts the peripheral speed of the reel and, accordingly, the unwinding of the safety line in such a manner that when the speed of the reel exceeds the normal walking speed the reel is automatically and immediately positively locked, not merely slowed down or braked. Furthermore, upon release of the tension on the safety line and the resumption of normal predetermined speed of movement the reel is first unlocked and then allowed to pay out the line at the predetermined speed of movement. The foregoing is accomplished through the medium of a reel normally spring-urged in one direction and having a governor geared to the reel and operable to actuate a positive locking device in the nature of a ratchet and pawl.

A better understanding will be had of the invention from the following description when read in connection with the drawings, in which:

Figure 1 is a vertical section through substantially the center of a safety device embodying the principles of this invention;

Figure 2 is a vertical section taken along line 2—2 of Figure 1;

Figure 3 is a vertical section taken along line 3—3 of Figure 1;

Figure 4 is an enlarged elevational detail of a portion of the locking mechanism; and Figure 5 is an enlarged section through a portion of the lower part of the reel illustrating the pay off rollers.

As will be seen from Figure 1 the entire safety device is mounted within or carried by the housing indicated by reference character 10 and comprises in general side plates 11, a top or head member 12 and a bottom member 13, the side plates being separated by spacers 14. The foregoing elements making up the housing may be secured together in any desired manner, as by welding or by bolts or cap screws (not shown). Mounted within the housing is a reel or drum indicated generally by reference character 20, the reel being made up of a rim 21 grooved to receive the safety line, side disks 22 and an annular spacing inner rim 23. The foregoing elements of the reel may be held together by any suitable means such as bolts 24. The side disks 22 are provided with centrally disposed bearing cups 25 which support bearings 26 which serve as journals for rotation about a relatively fixed shaft 27 which is, however, rotatively supported in the side plates 11 for reasons to be explained. The reel 20 is thus mounted for rotation on shaft 27 by means of bearings 26. The reel is normally urged in one direction by a clock-type spring 28 having one end fastened to the spacing rim 23 and the other end fastened to shaft 27 at 29 as shown in Figure 1. Fastened to one end of shaft 27 and located in an auxiliary housing 30 is a worm wheel 31 engaged by a worm 32 journaled in the auxiliary housing 30 and lockable into adjusted position by a set screw 33. Rotation of worm 32 by means of a suitable handle (not shown) will rotate shaft 27 to give an initial bias or tension to spring 28. Thus, any given predetermined degree of retrieving pull on the safety line L wound on the drum can be quickly set by appropriate pre-tension of spring 28.

The head element 12 is provided with a pulley 35 suitable for engaging with a supporting cable 36 securable to any fixed object on a roof or which may span the space between any two fixed points so as to permit travel of the safety device.

The bottom member 13 is provided with a traveling sheave 40 and a traveling guide wheel 41 both grooved to receive and guide the safety line L to and from the reel or drum in a manner to prevent tangling as the safety line is wound or unwound upon the reel.

In order to control the pay out of the safety line within predetermined and adjustable limits an inertia governor energizedly centrifugal force is geared to the reel and controls a positive locking mechanism whereby rotation of the reel is limited to about two linear feet of the safety line if the movement of the reel exceeds the predetermined rate of rotation. For this purpose a ring gear 45 having internal teeth 46 is fastened to one side disk 22. Ring gear 45 engages a spur gear 47 fast on a short shaft 48 journaled in bearings 49 positioned in one side plate 11 and also in an auxiliary housing or cap 50. Also secured to shaft 48 is a governor disk 54 carrying a pair of weights 55 and 55a pivoted at 56 and 56a and connected together by a link 57. The governor weights 55 and 55a are urged to their inward positions by a calibrated tension spring 57 and a calibrated compression spring 58. As is obvious from Figure 2, these two springs oppose the centrifugal action tending to throw the weights radially outward. The springs are precalibrated and may be selected to permit outward movement of the pivoted weights at any desired and predetermined rate of rotation of the governor disk 54. Weight 55 is provided with a projecting nose 60 adapted to engage any one of a plurality of projections or ratchet teeth 61 formed on an annular ring 62 surrounding disk 54 and mounted for limited rotational movement within the cap 50.

Ring 62 carries a pin 65 projecting laterally from one side thereof. The ring 62 and its pin serve as the actuating means for the locking device which positively locks the drum or reel when the governor becomes operative because of excessive movement of the safety line. Pin 65 projects into a slot 66 in a plate 67 pivoted at 68 and connected upon the opposite side of pin 68 from pin 65 to two links 69. Links 69 are connected at their opposite ends to dogs or pawls 71 engageable with diametrically opposite ratchet teeth 73 formed on the exterior of ring gear 45. Plate 67 is normally urged counterclockwise (Figure 4) by tension spring 74 and normally retains the dogs 71 out of engagement with teeth 73 thus permitting rotation of the reel.

As initially designed and set the reel will contain approximately forty-five feet of $3/16$ inch safety line preferably of nylon or one of the other synthetic fibers. The retrieving pull on the safety line is initially set at from five to forty pounds by adjustment of the worm 32. As previously stated, the springs 57 and 58 are chosen so that the desired movement of safety line can occur without the governor becoming effective. It has been found satisfactory to select these springs so that movement equivalent to four and one-half miles per hour, i. e., a fast walk, is permissible without the reel becoming locked through operation of the governor. When so designed, it has been found that the reel will automatically lock upon pay out of 18 to 24 inches of the safety line at a speed in excess of that normally permitted.

It should be noted that if either or both of springs 57 and 58 become weakened or broken the reel will automatically lock immediately upon rotation of the governor. This is an added safety feature. Likewise, if spring 74 becomes weakened or is broken the tendency is for the locking dogs to become operative rather than inoperative. This is another added safety feature.

The operation generally and briefly is as follows:

As long as the workman using the reel proceeds at a normal rate he may utilize the full length of the safety line before shifting the position of the reel. If, however, he should stumble or slip or attempt to move beyond a safe speed the reel 20 will rotate at a speed in excess of that permissible and its ring gear will rotate the spur gear 47 thus rotating the governor disk sufficiently to cause the weights 55 and 55a to swing outwardly due to centrifugal action. This will cause dog 60 to engage a ratchet tooth 61 and thus rotate ring 62 slightly thus moving pin 65 which in turn will rotate plate 67 which when moved will push on one arm 69 and pull on the other thus moving locking pawls or dogs 71 into position to engage diametrically opposite teeth 73 on ring gear 45, which will immediately lock reel 20. As soon as the worker regains his feet or slows down to the predetermined allowed speed of movement tension on his safety line is released, spring 28 tends to rewind the reel and springs 57 and 58 will retract the governor weights 55 and 55a thus releasing dog 60 from tooth 61 and spring 74 will retract plate 67 thus releasing dogs 71 from teeth 73 and the workman will immediately be able to proceed at the prescribed rate.

On the contrary, however, as long as tension is maintained on the safety line, for example, if the worker is actually disabled the tension on the line not being released spring 28 will not rewind the line and dogs 71 will remain in engagement with teeth 73 and the reel 20 and safety line L will remain locked until the workman regains his feet or is relieved by an associate.

From the foregoing it will be apparent that there has been provided a self-restraining and self-retrieving safety reel particularly designed so as to prevent workmen working on roofs or other high places from falling or proceeding at an unsafe speed. The device does not permit any undue slack in the safety line and prevents any undue sudden jerk when the safety line becomes locked.

It will be apparent to those skilled in the art that while the device as shown is particularly designed for the purposes above stated a similar device could be used as a safety device on a vertical door, for example, or even upon an elevator and that minor changes may be made in the details of construction without departing from the spirit and scope of the invention as defined in the appended claims.

I claim:

1. In a safety device, a housing, a reel rotatably supported therein, a safety line normally wound on said reel and having an end extending outwardly of said housing, yielding means normally tending to rotate said reel to wind said line thereon, a ring gear secured to said reel for rotation therewith, an inertia governor carried by said housing and having a movable weight, means for driving said governor from said ring gear, means operable at a predetermined rate of movement of said governor to positively and substantially immediately lock said reel against rotation, and means normally urging said locking means to released position, said locking means being substantially immediately released by said latter means upon release of unwinding tension upon said line, and counter rotation of said reel caused by said yielding means.

2. In a safety device, a housing, a reel rotatably supported therein, a safety line normally wound on said reel and having an end extending outwardly of said housing, yielding means normally tending to rotate said reel to wind said line thereon, a ring gear secured to said reel for rotation therewith, a shaft, a spur gear on said shaft engaging said ring gear and driven thereby, an inertia governor having a movable weight and being driven by said shaft, an actuator member mounted for limited movement by said governor weight upon a pre-determined rate of rotation of said reel, and locking means operable by said actuator upon limited movement thereof for substantially immediately locking said reel against rotation at a pre-determined rotation of said reel, said locking means being substantially immediately released upon release of unwinding tension upon said safety line and counter rotation of said reel by said yielding means.

3. In a safety device as defined in claim 2 wherein said weight has a dog engaging teeth on said actuator and said locking means comprises at least one dog engaging teeth on said ring gear.

References Cited in the file of this patent

UNITED STATES PATENTS

| 1,016,299 | Snyder | Feb. 6, 1912 |
| 2,166,792 | Black | July 18, 1939 |
| 2,546,202 | Trouin | Mar. 27, 1951 |
| 2,594,484 | Nixon | Apr. 29, 1952 |

FOREIGN PATENTS

| 1,080,365 | France | May 26, 1954 |